United States Patent
Chen et al.

(10) Patent No.: US 12,065,071 B2
(45) Date of Patent: Aug. 20, 2024

(54) VEHICLE MULTI-FUNCTION LED LAMP WITH INPUT CURRENT SWITCH

(71) Applicant: North American Lighting, Inc., Paris, IL (US)

(72) Inventors: Penghao Chen, Farmington Hills, MI (US); Kevin Lee Markell, Fenton, MI (US)

(73) Assignee: North American Lighting, Inc., Paris, IL (US)

( * ) Notice: Subject to any disclaimer, the term of this patent is extended or adjusted under 35 U.S.C. 154(b) by 419 days.

(21) Appl. No.: 17/108,523

(22) Filed: Dec. 1, 2020

(65) Prior Publication Data

US 2022/0169170 A1  Jun. 2, 2022

(51) Int. Cl.
| | | |
|---|---|---|
| *B60Q 1/00* | (2006.01) | |
| *B60Q 1/26* | (2006.01) | |
| *B60Q 1/34* | (2006.01) | |
| *B60Q 1/44* | (2006.01) | |
| *F21S 43/14* | (2018.01) | |
| *H05B 45/10* | (2020.01) | |

(52) U.S. Cl.
CPC ......... *B60Q 1/0076* (2013.01); *B60Q 1/2696* (2013.01); *B60Q 1/34* (2013.01); *B60Q 1/44* (2013.01); *F21S 43/14* (2018.01); *H05B 45/10* (2020.01)

(58) Field of Classification Search
None
See application file for complete search history.

(56) References Cited

U.S. PATENT DOCUMENTS

| | | | | |
|---|---|---|---|---|
| 6,034,599 | A * | 3/2000 | Beacom | B60Q 1/305 340/463 |
| 10,596,987 | B2 * | 3/2020 | Park | B60L 1/16 |
| 2004/0178737 | A1 * | 9/2004 | Takeda | B60Q 1/2696 315/80 |
| 2005/0265039 | A1 * | 12/2005 | Lodhie | B60Q 1/2607 340/479 |
| 2019/0077301 | A1 | 3/2019 | Kosugi et al. | |
| 2019/0150236 | A1 | 5/2019 | Niedermeier et al. | |

FOREIGN PATENT DOCUMENTS

EP  3 451 797 A1  3/2019

* cited by examiner

*Primary Examiner* — Crystal L Hammond
(74) *Attorney, Agent, or Firm* — Brooks Kushman PC

(57) ABSTRACT

A multi-function vehicle lamp having a plurality of light emitting diodes includes a turn input and a tail input with a switch configured to stop current flowing through the tail input when the turn input is energized to increase current flow through the turn input to satisfy minimum current draw requirements of a vehicle current meter that detects turn indicator failure. The lamp may include a single combined turn/stop input, or may include separate turn and stop inputs. Lamps having separate turn and stop inputs block current flow through the stop input when the turn input is energized.

20 Claims, 5 Drawing Sheets

VEHICLE MULTI-FUNCTION LED LAMP WITH INPUT CURRENT SWITCH

TECHNICAL FIELD

The present disclosure relates to a multi-function LED lamp for a vehicle.

BACKGROUND

Vehicle lighting systems and associated governmental regulations were developed based on traditional filament-based bulb technology. One such regulation requires detection of failure of one or more turn signal lamps by the turn signal indicator being a "steady on", "steady off" or having a significant change in the flashing rate to alert the vehicle operator. Some vehicle manufacturers detect lamp failures by monitoring the input current of the associated lamp. A lamp failure is identified when input current with the lamp energized is below a specified minimum current indicating an open circuit, or above a specified maximum current indicating a short circuit. Light-emitting diode (LED) technology provides designers the ability to combine lamp functions, such as stop, turn, and tail lighting functions into a single multi-function lamp. LEDs also require significantly less current for operation than the traditional incandescent or filament-based lamps for the same light output. As such, LED lamps may include a dummy load to increase input current beyond that otherwise required to operate the LEDs solely to satisfy the minimum current specifications of the vehicle manufacturers' failure detection strategy. The dummy load generates heat that must be dissipated, which may increase costs and constrain lamp design due to the additional circuit board surface area required to accommodate associated heat sinks.

SUMMARY

A system and method for controlling current to LEDs of a multi-function vehicle lamp include controlling a switch to block current through a tail input in response to a signal for a turn input such that minimum current flowing through the turn input when illuminating the LEDs for the turn lamp function exceeds minimum current specifications of a vehicle turn lamp failure detector or meter.

Embodiments include a vehicle lamp comprising a plurality of light emitting diodes configured to illuminate in response to receiving a signal on a turn input or on a tail input, and a switch configured to selectively block current flow through the tail input to the plurality of light emitting diodes in response to the signal on the turn input. The switch may be further configured to allow current flow from the tail input to the plurality of light emitting diodes when no signal is applied to the turn input. The vehicle lamp may include a stop input, wherein the plurality of light emitting diodes is further configured to illuminate in response to receiving the signal on the stop input. The switch may be further configured to selectively block current flow from the stop input to the plurality of light emitting diodes in response to the signal on the turn input. In various embodiments, the turn input and the stop input comprise a single combined input. Alternatively, the turn input may be electrically connected to the stop input. The vehicle lamp may include an electrical load connected directly or indirectly to the turn input to increase current flow through the turn input above a minimum current to satisfy a vehicle turn indicator monitor in response to the switch blocking current flow from the tail input. In one or more embodiments, the switch comprises a plurality of transistors. In one embodiment, the switch comprises a first transistor configured to turn on in response to the signal on the turn input, and a second transistor coupled to the first transistor and configured to turn off and block current flowing through the tail input in response to the first transistor turning on.

One or more embodiments of a vehicle lamp include a plurality of light emitting diodes configured to illuminate in response to receiving a signal on a tail input or on a turn input, and a switching circuit connected to the tail input and the turn input and including a switch connected to the tail input and configured to open in response to the signal on the turn input to prevent current flowing through the tail input, and to close in response to no signal on the turn input to allow current to flow through the tail input. The vehicle lamp may include an electric load activated in response to the switch being open and configured such that minimum current flow through the turn input when energized to illuminate the plurality of light emitting diodes exceeds minimum current flow through the tail input when energized to illuminate the plurality of light emitting diodes. The electrical load may be a "dummy" load that functions solely or primarily to increase current flow through the turn input. In one embodiment, the switching circuit comprises a first transistor connected to the turn input and configured to control the switch to open in response to the signal on the turn input. The switch may include a second transistor. In some embodiments, the lamp includes a separate stop input connected to the switching circuit, wherein the switch is further configured to prevent current flowing through the stop input in response to the signal on the turn input. The vehicle lamp may include a stop input connected to the switching circuit, wherein the switching circuit comprises a second switch configured to open in response to the signal on the turn input to prevent current flowing through the stop input. Alternatively, the vehicle lamp may include a single combined turn/stop input.

Embodiments also include a method for controlling a vehicle lamp having a plurality of light emitting diodes illuminated in response to a signal on a turn input or a tail input, comprising, by a controller or control circuitry: stopping current flow through the tail input to the plurality of light emitting diodes in response to the signal on the turn input; and allowing current flow through the tail input to the plurality of light emitting diodes in response to no signal on the turn input. The method may include stopping current flow and allowing current flow by controlling a switch in response to the signal on the turn input. The lamp may include a stop input connected to the light emitting diodes with the method further including stopping current flow through the stop input to the plurality of light emitting diodes in response to the signal on the turn input. The method may also include connecting an electrical load to the turn input to provide a minimum current through the turn input when the signal is on the turn input that, the minimum current exceeding current through the tail input when the signal is on the tail input to illuminate the light emitting diodes.

Embodiments according to the present disclosure may provide associated advantages. For example, the present disclosure provides a multi-function LED lamp for a vehicle that reduces or eliminates a dummy load otherwise required to meet vehicle requirements for monitoring operation of the turn lamp function. Reducing or eliminating the otherwise required dummy load lessens heat dissipation considerations and provides associated greater design flexibility and smaller packaging.

The above advantages and other advantages and features of the present disclosure will be apparent from the following detailed description of the preferred embodiments when taken in connection with the accompanying drawings.

DETAILED DESCRIPTION

Figure 1:
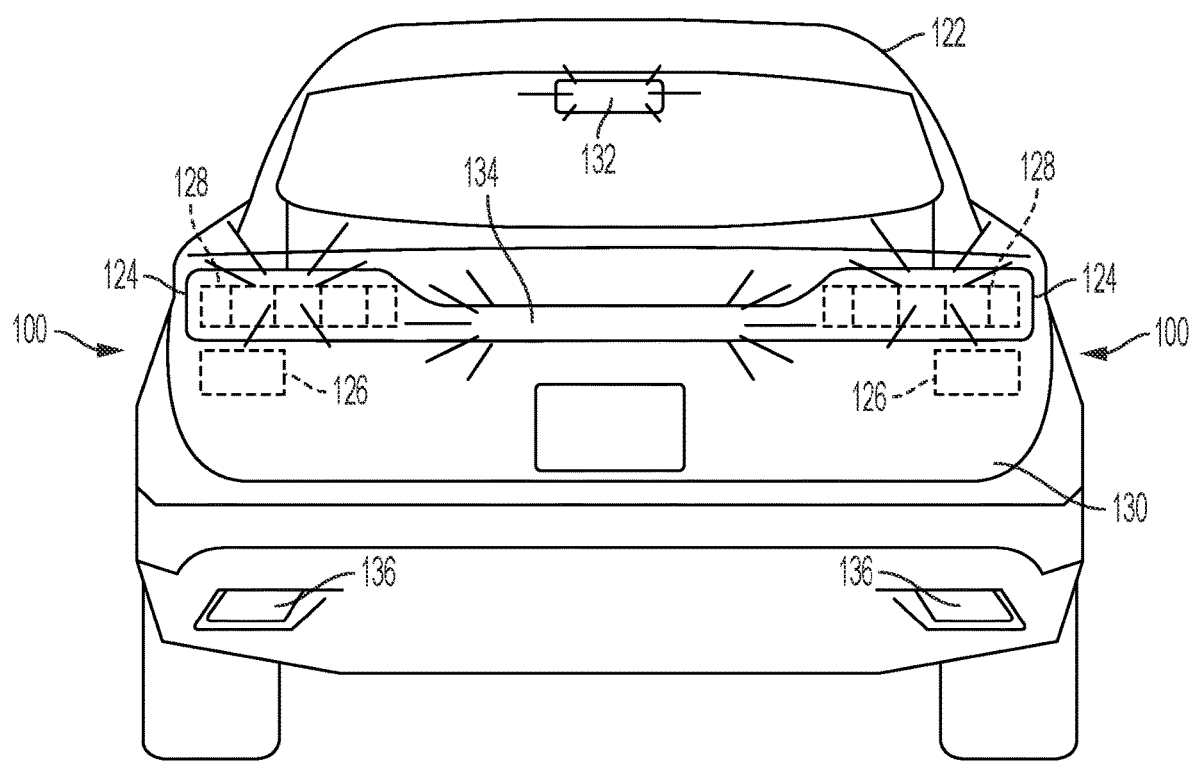
FIG. 1 illustrates a representative vehicle application having a multi-function or combination lamp with a current switch.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments of the claimed subject matter that are not explicitly illustrated or described. The combinations of features illustrated provide representative embodiments for typical applications. Various combinations and modifications of the features consistent with the teachings of this disclosure could be desired for particular applications or implementations.

The embodiments of the present disclosure generally provide for a plurality of circuits or other electrical devices. All references to the circuits and other electrical, electronic, solid-state devices and the functionality provided by each, are not intended to be limited to encompassing only what is illustrated and described herein. Discrete components may be combined in one or more integrated devices or circuits. While particular labels may be assigned to the various circuits or other devices disclosed, such labels are not intended to limit the scope of operation for the circuits and the other electrical devices. Such circuits and other devices may be combined with each other and/or separated in any manner based on the particular type of electrical implementation that is desired.

Government vehicle regulations may require detection and driver notification of a turn signal lamp or other lamp failure. For example, in the United States, FMVSS108 S9.3.6 requires that failure of one or more turn signal lamps resulting in required photometric performance not being met must be indicated by the turn signal pilot indicator providing a "steady on", "steady off", or a significant change in the flashing rate. Some vehicle manufacturers judge lamp failure by lamp input current and may refer to the input current measuring and monitoring function or logic as a "current meter" or simply "meter". The current meter may have three states including good/operational, bad/failure, and undefined. The undefined state may provide a buffer or margin above the minimum current threshold where it would be difficult to definitively determine whether the lamp was operating or not due to fluctuations in component tolerances, vehicle operating voltages, ambient/operating temperatures, etc. As such, the lamp input current within the undefined current range is undesirable or prohibited by vehicle manufacturers. In one example, the current meter requirements specify that input current for an operating lamp is between about 600 mA and 2.75 A, while an inoperative lamp is above 2.75 A or below 250 mA across vehicle voltages between 9 V and 16 V and temperatures of −40 C to 85 C. Operation of the lamp with input current between 250 mA and 600 mA is prohibited in this example as being an undefined state. These current limits are typically created based on operating characteristics of traditional filament bulbs. As such, LED implementations create unique design constraints to satisfy the vehicle manufacturers requirements that have typically been satisfied using a dummy load to increase current through the turn lamp input above that required to illuminate the LED lamp to meet the vehicle requirements for monitoring/detection of turn lamp functionality.

With reference to FIG. 1, a representative vehicle lighting system 100 having one or more combination or multi-function lamps with a current switch according to one or more embodiments is shown. Each multi-function lamp may provide a combination of lighting functions, such as a brake/stop light, a tail light, and a turn light, for example. The lighting system 100 is provided for a vehicle 122 and includes semi-conductor light emitting devices, such as light emitting diodes (LEDs) or similar solid-state devices that are disposed within a rear combination lamp (RCL) 124. The illustrated embodiment depicts two RCLs 124, where each RCL 124 includes a lamp having a current switch and optional dummy load to operate within current ranges specified by the vehicle lamp operating detection or current meter as described herein. Each RCL 124 includes a plurality of light emitting devices 128 that may each emit substantially the same color of light, best illustrated in FIGS. 2, 4. The light emitting devices 128 may include LEDs or other semi-conductor or solid-state lighting devices. Each RCL 124 may include a module 126, such as a driver module and/or other electric, electronic, or similar circuitry. Of course, vehicle 122, RCLs 124 and various other lamps or modules are merely representative for illustration and description and the claimed subject matter is not necessarily limited to the examples provided.

In the illustrated representative vehicle, the RCL 124 is mounted to a rear closure, such as a trunk lid or lift gate 130 and includes light emitting devices 128 that are configured for tail lighting, brake lighting and turn signal lighting. Of course, the claimed subject matter is independent of the particular mounting configuration or arrangement and one or more lamps may be mounted on or across various vehicle structures or panels including both fixed and movable structures. The vehicle 122 may include other lamps that are also mounted to the lift gate 130, such as a center high mount stop lamp (CHMSL) 132 and a rear applique lamp (RAPL) 134. The CHMSL 132 is intended to provide a deceleration warning to following drivers whose view of the vehicle's left and right RCL assemblies 124 is blocked by interceding vehicles. The RAPL 134 is provided for aesthetic purposes and may be illuminated in a custom pattern. A redundant module lamp (RML) 136 is mounted to a lower portion of the vehicle 122. As depicted in FIG. 1, the RCL 124, CHMSL 132 and RAPL 134 may be activated and the RML 136 is deactivated, when an ignition position is on, and the lift gate 130 is closed. The RCL 124, CHMSL 132 and RAPL 134 may be deactivated and the RML 136 activated, when an ignition position is on, and the lift gate 130 is ajar or open.

Figure 2:
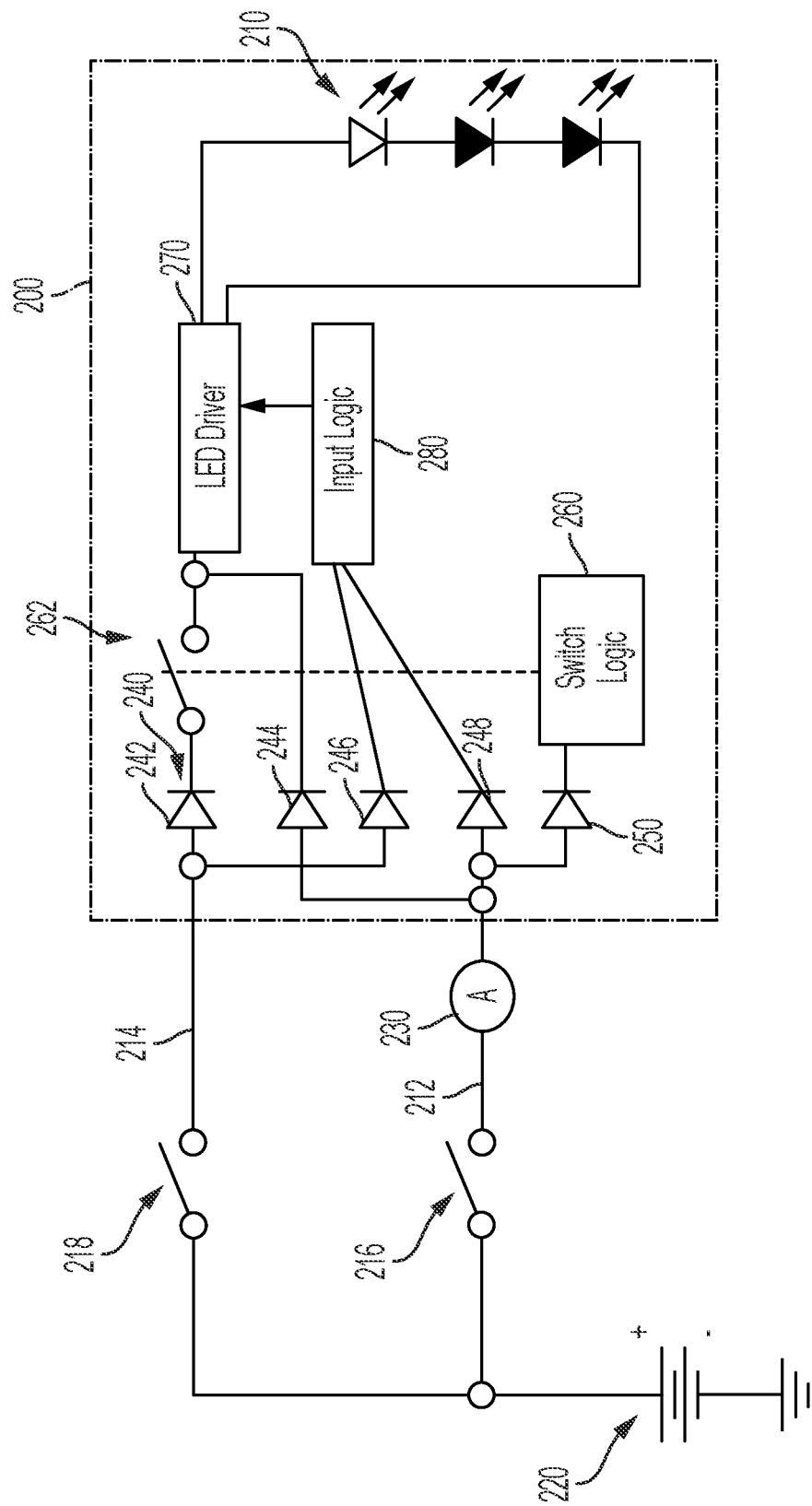
FIG. 2 is a block diagram illustrating a vehicle lamp with a combined stop/tail input having a current switch.

FIG. 2 is a block diagram illustrating functional components of a representative combination or multi-function vehicle lamp 200, which may be used as an RCL 124 in a vehicle 122 as described with reference to FIG. 1, for example. Vehicle lamp 200 includes a plurality of light emitting diodes (LEDs) 210 configured to illuminate in response to receiving a signal on a turn input 212 or on a tail input 214. As previously described, LEDs 210 represent any solid-state or semi-conductor light emitter. In the representative embodiment illustrated, turn input 212 is implemented as a single combined stop/turn input that is activated by the vehicle to illuminate LEDs 210 for both stop and turn functions by selective operation of a corresponding vehicle stop/turn switch 216. LEDs 210 are also configured to illuminate in response to receiving a signal on tail input 214 by selective operation of a corresponding vehicle tail switch 218. Selective operation of stop/turn switch 216 connects voltage from a vehicle battery 220 to the stop/turn input 212. Similarly, selective operation of tail switch 218 connects voltage from vehicle battery 220 to tail input 214.

The vehicle may include a turn lamp monitoring circuit as generally represented by current meter 230, which may sometimes be referred to simply as a meter. The monitoring circuitry may be used to control the turn signal indicator in the vehicle in response to the current draw through the stop/turn input 212 to detect a turn lamp failure and change the turn signal indicator to a steady on, steady off, or increased flashing rate when a turn lamp failure is detected based on the current through the stop/turn input 212 while the turn signal is activated as described in greater detail with reference to FIG. 5. Turn lamp failure may be indicated by the current detected by current meter 230 being below a first threshold corresponding to an open circuit, or being above a second threshold higher than the first threshold corresponding to a short circuit. A third current threshold may be specified by the vehicle manufacturer as the minimum current for detecting an operating turn lamp to accommodate variations in current flow for an operative lamp that may be associated with component tolerances, operating temperature, and battery voltage, for example.

Vehicle lamp 200 may include various circuitry and components such as one or more diodes 240. Diode 242 may control current flow direction from tail input 214 to switch 262 and LED driver 270 as well as various downstream components, such as LEDs 210. Similarly, Diode 244 may control current flow direction from stop/turn input 212 to LED driver 270. Diode 246 controls current flow direction from tail input 214 to input logic 280. Diode 248 controls current flow direction from combined stop/turn input 212 to input logic 280. Diode 250 controls current flow direction from combined stop/turn input 212 to switch logic 260, which controls selective operation of current switch 262.

Switch 262 is controlled by switch logic 260 and is configured to selectively block current flow from the tail input 214 to the plurality of light emitting diodes (LEDs) 210 in response to activation of the signal on the turn input 212 as illustrated and described in greater detail with reference to the representative circuitry of FIG. 3. In particular, in response to energization of stop/turn input 212 by closing switch 216 to connect stop/turn input 212 to the vehicle battery 220, switch logic 260 opens switch 262 to block current from tail input 214. As such, all current flows through stop/turn input 212 to illuminate LEDs 210. This increases current flow as detected/monitored by current meter 230 to meet the vehicles' minimum current flow requirements to indicate an operable turn lamp relative to dividing current between tail input 214 and stop/turn input 212 when both are activated. As such, the minimum current requirements may be met while reducing or eliminating a dummy load and associated heat dissipation requirements associated with various prior art implementations.

LED driver circuitry or module 270 provides appropriate voltage and current to illuminate LEDs 210 based on one or more signals from input logic 280 to determine which of the plurality of LEDs 210 to illuminate and/or to provide a desired light intensity depending on whether the signal corresponds to the tail input 214 or the stop/turn input 212. For example, activation of tail input 214 may result in fewer LEDs being illuminated, or the same number of LEDs illuminated but with lower intensity as compared to activation of stop/turn input 212.

Figure 3:
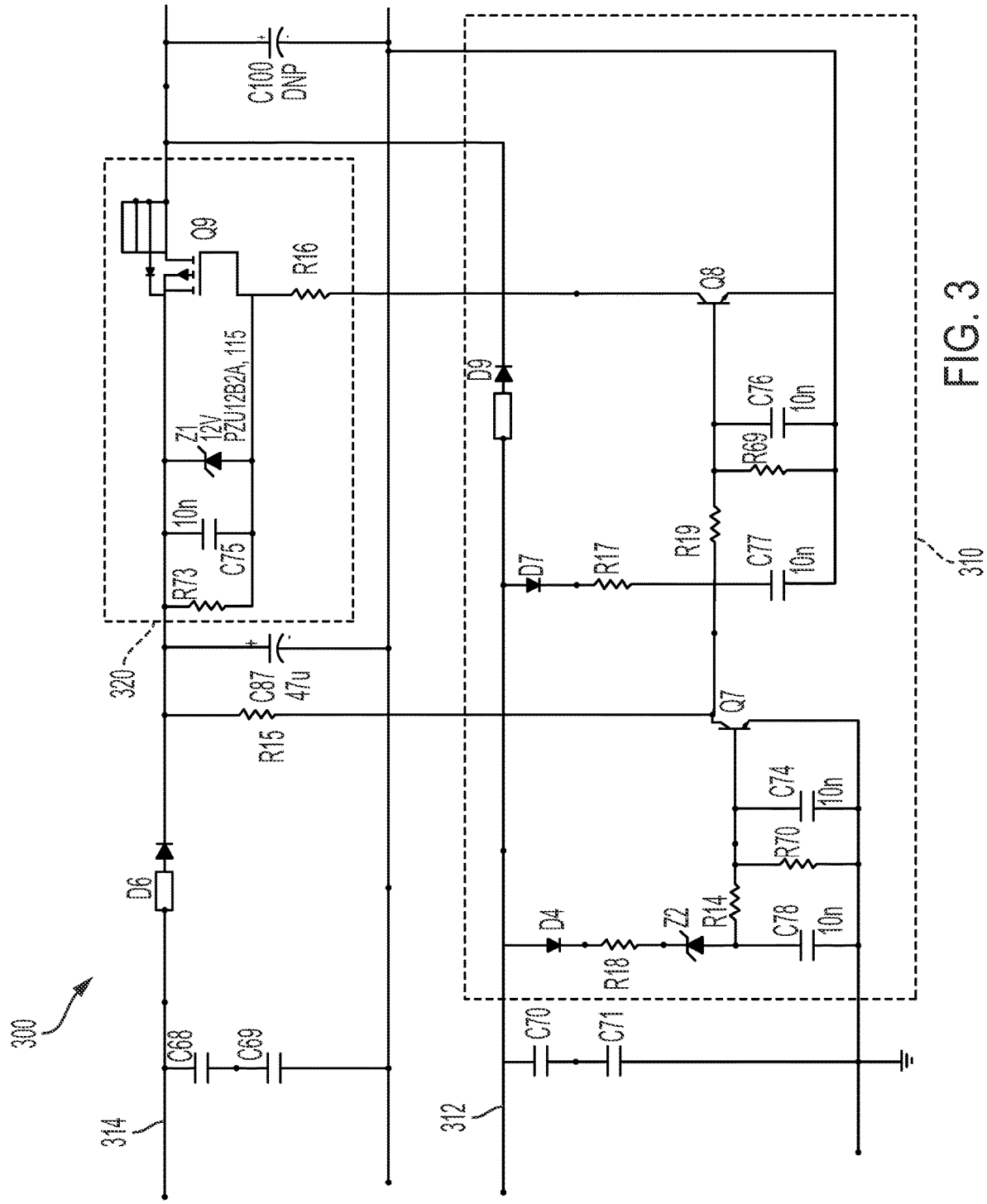
FIG. 3 is a circuit diagram illustrating a representative implementation of vehicle lamp having a current switch.

FIG. 3 illustrates a representative circuit schematic implementing a current switch and associated switch logic for a multi-function vehicle lamp. Circuitry 300 includes representative switch logic 310 that controls an associated representative switch 320 in response to a signal on turn input 312 to selectively block current flowing through tail input 314 to a plurality of LEDs (FIG. 2). Similar to the block diagram illustration of FIG. 2, turn input 312 comprises a single combined turn/stop input. In the representative embodiment of FIG. 3, battery voltage applied to turn/stop input 312 turns ON a first transistor Q7 and turns OFF a second transistor Q8 and third transistor Q9. This significantly reduces or completely blocks current flow through tail input 314 such that all current flowing to the LEDs passes through turn/stop input 312 to satisfy the minimum current requirements of the vehicle current meter as previously described and as illustrated and described in greater detail with reference to FIG. 5. In the representative embodiment illustrated in FIG. 3, transistors Q7 and Q8 are implemented by bipolar junction transistors while transistor Q9 is implemented by a power MOSFET.

Switch logic 310 also operates to allow current flow through tail input 314 to the LEDs in response to the signal (battery voltage) not being applied on turn/stop input 312. When no signal is applied to turn/stop input 312, battery voltage applied to tail input 314 turns transistor Q7 OFF, transistor Q8 ON, and transistor Q9 ON, such that current flows through tail input 314 to the LEDs.

Figure 4:
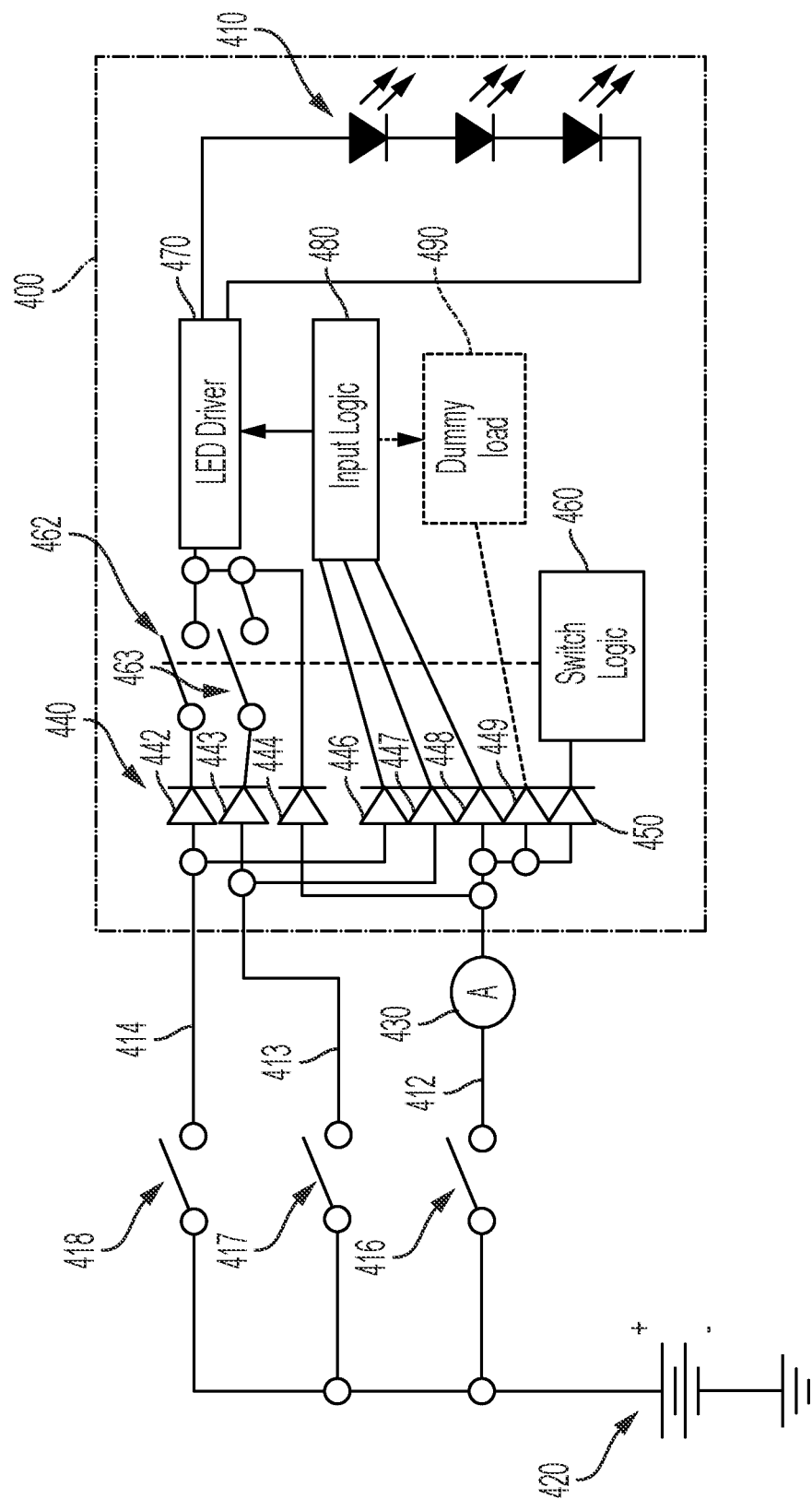
FIG. 4 is a block diagram illustrating a vehicle lamp having separate stop, tail, and turn inputs and a current switch.

FIG. 4 is a block diagram illustrating functional components of a representative combination or multi-function vehicle lamp 400, which may be used as an RCL 124 in a vehicle 122 as described with reference to FIG. 1, for example. Vehicle lamp 400 includes a plurality of light emitting diodes (LEDs) 410 configured to illuminate in response to receiving a signal on a turn input 412, a stop input 413, or a tail input 414. LEDs 410 represent any solid-state or semi-conductor light emitter. In the representative embodiment illustrated, turn input 412 is implemented as a separate input from stop input 413. Turn input 412 is activated by the vehicle to illuminate LEDs 410 for the turn signal function by selective operation of a corresponding vehicle turn switch 416. LEDs 410 are also configured to illuminate in response to receiving a signal on stop input 413 by selective operation of a corresponding vehicle stop switch 417. Similarly, LEDs 410 are also configured to illuminate in response to receiving a signal on tail input 414 by selective operation of a corresponding vehicle tail switch 418. Selective operation of turn switch 416 connects voltage from a vehicle battery 420 to the turn input 412. Similarly, selective operation of stop switch 417 connects voltage from vehicle battery 420 to stop input 413. Likewise, selective operation of tail switch 418 connects voltage from vehicle battery 420 to tail input 414.

As previously described, the vehicle may include a turn lamp monitoring device or circuitry as generally represented by current meter 430, which may sometimes be referred to simply as a meter. The monitoring circuitry may be used to control the turn signal indicator inside the vehicle cabin in response to the current draw through the turn input 412 to detect a turn lamp failure and change the turn signal indicator to a steady on, steady off, or increased flashing rate when a turn lamp failure is detected by current meter 430 based on the current through the turn input 412 while the turn signal is activated as described in greater detail with reference to FIG. 5. Turn lamp failure may be indicated by the current detected by current meter 430 being below a first threshold corresponding to an open circuit, or being above a second threshold higher than the first threshold corresponding to a short circuit. A third current threshold may be specified by the vehicle manufacturer as the minimum current for detecting an operating turn lamp to accommodate variations associated with component tolerances, operating temperature, and battery voltage, for example, that may affect current flow for an operative lamp.

Vehicle lamp 400 may include various circuitry and components such as one or more diodes 440. Diode 442 may control current flow direction from tail input 414 to switch 462 and LED driver 470 as well as various downstream components, such as LEDs 410. Diode 443 controls current flow direction from stop input 413 to LED driver 470. Similarly, diode 444 controls current flow direction from turn input 412 to LED driver 470. Diode 446 controls current flow direction from tail input 414 to input logic 480. Diode 447 controls current flow direction from stop input 413 to input logic 480. Diode 448 controls current flow direction from turn input 412 to input logic 480. Diode 450 controls current flow direction from turn input 412 to switch logic 460, which controls selective operation of current switches 462 and 463.

Various embodiments may include a dummy load 490 connected to turn input 412 and input logic 480. A corresponding diode 449 may control current flow from turn input 412 to dummy load 490. Dummy load 490 may be provided in applications or implementations where blocking current from tail input 414 and stop input 413 in response to a signal on turn input 412 as monitored by current meter 430 may otherwise fall below a corresponding threshold used to detect operation of the LEDs 410 in a turn lamp function under some operating conditions. As such, dummy load 490 increases current flow through turn input 412 when switch 416 is closed above the current flow that would otherwise result from operating LEDs 410 and related circuitry. While some applications or implementations may include a dummy load 490, use of one or more current switches to block current from the stop input 413 and the tail input 414 in response to a signal on turn input 412 reduces or minimizes the wasted current associated with the dummy load 490 than would otherwise be required. This results in reducing or eliminating associated heat sinks and related circuit board surface area required for thermal management relative to previous applications that incorporated dummy loads with higher current draw. A dummy load may also be provided in some applications or implementations that have a combined tail/stop input, such as the representative embodiments illustrated in FIGS. 2-3.

As also shown in FIG. 4, switches 462 are controlled by switch logic 460 and are configured to selectively block current flow from the stop input 413 and the tail input 414 to the plurality of light emitting diodes (LEDs) 410 in response to activation of the signal on the turn input 412. In particular, in response to energization of turn input 412 by closing switch 416 to connect turn input 412 to the vehicle battery 420, switch logic 460 opens switches 462 and 463 to block current from tail input 414 and stop input 413, respectively. As such, all current flows through turn input 412 to illuminate LEDs 410. This increases current flow as detected/monitored by current meter 430 to meet the vehicles' minimum current flow requirements to indicate an operable turn lamp relative to dividing current among tail input 414, stop input 413, and turn input 412 when all are activated by associated vehicle switches 418, 417, and 416, respectively. As such, the minimum current requirements may be met while reducing or eliminating dummy load 490 and associated heat dissipation requirements associated with various prior art implementations.

LED driver circuitry or module 470 provides appropriate voltage and current to illuminate LEDs 410 based on one or more signals from input logic 480 to determine which of the plurality of LEDs 410 to illuminate and/or to provide a desired light intensity depending on whether the signal corresponds to the tail input 414, the stop input 413, and/or the turn input 412. For example, activation of tail input 414 may result in fewer LEDs 410 being illuminated, or the same number of LEDs 410 illuminated but with lower intensity as compared to activation of stop input 413 or turn input 412.

Figure 5:
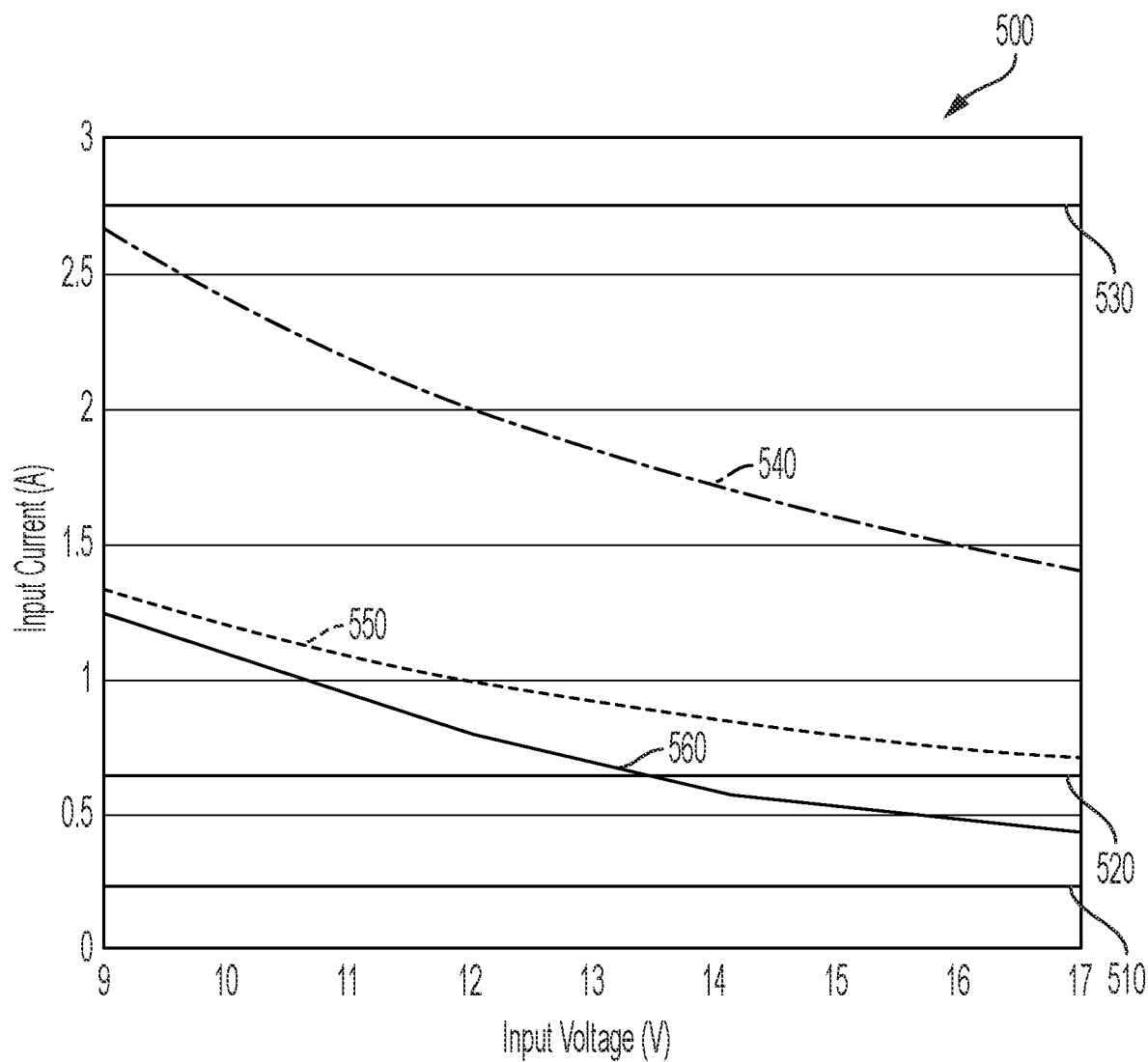
FIG. 5 illustrates operation of a representative vehicle lamp with respect to current as a function of voltage to detect a lamp failure.

FIG. 5 is a graph illustrating operation of a vehicle current meter or monitoring device to monitor operation of a turn lamp. Graph 500 illustrates input current as a function of input voltage for a representative LED lamp. Vehicle manufacturers may use various current thresholds to detect operation of the turn lamp. In many instances, these thresholds were established based on current required for operation of incandescent or filament bulbs rather than LED lamps as previously described. The representative current monitor operation illustrated in FIG. 5 includes three thresholds 510, 520, and 530 that define associated states for operational, non-operational, and undefined. The current meter typically specifies and monitors input current for voltages ranging from 9V to 16V over a temperature range of −40 C to 85 C. The representative current monitor illustrated in FIG. 5 includes a threshold 510 that defines a non-operational state indicative of an open circuit, i.e. input current below the first threshold 510 (about 200 mA in this example) with the turn lamp ON is indicative of an open circuit and non-operational state. Input current between threshold 510 and threshold 520 (about 600 mA in this example) corresponds to an undefined operational state where the current monitor is unable to determine whether or not the turn lamp is operational. As such, lamp suppliers are required to design turn lamps that do not have a current draw within this region either when operational, or non-operational for proper functioning of the vehicle current meter or monitor. Current draw between threshold 520 and threshold 530 (about 2.75 A in this example) corresponds to an operational turn lamp. Current draw above threshold 530 is indicative of a short circuit and is detected by the current meter or monitor as a non-operational lamp.

Current draw for an LED turn lamp may vary due to component tolerances in the associated circuitry components or drivers, supply voltage, operating voltage, ambient operating conditions, etc. Lines 540 and 550 of FIG. 5 illustrate representative maximum and minimum current draw, respectively, of LED turn lamps as a function of input voltages ranging from 9V to 16V over a temperature range of −40 C to 85 C. For comparison, line 560 illustrates a minimum current draw of an LED turn lamp that would not meet the vehicle manufacturer's current meter requirements because of operation within the undefined state between threshold 510 and threshold 520 at higher supply voltages and operating temperatures. According to the present disclosure, providing an input current switch alone or in combination with a dummy load may be used to increase current draw of the LED lamp minimum current draw from that represented by line 560 to a current as represented by line 550 that does not cross threshold 520 under the specified operating conditions.

As generally illustrated in FIGS. 1-5, a method for controlling a vehicle lamp 200; 400 having a plurality of light emitting diodes 210; 410 illuminated in response to a signal on a turn input 212; 412 or a tail input 214; 414, comprising, by a controller or control circuitry 300 includes stopping current flow through the tail input 214; 414 to the plurality of light emitting diodes 210; 410 in response to the signal on the turn input 212; 412, and allowing current flow through the tail input 214; 414 to the plurality of light emitting diodes 210; 410 in response to no signal on the turn input 212; 412. Stopping current flow and allowing current flow may include controlling a switch 262; 462 in response to the signal on the turn input 212; 412. In one or more embodiments, the lamp 400 includes a separate stop input 413 connected to the light emitting diodes 410, and the method includes stopping current flow through the stop input 413 to the plurality of light emitting diodes 410 in response to the signal on the turn input 412. Embodiments may also include connecting an electrical load 490 to the turn input 412 to provide a minimum current through the turn input 412 when the signal is on the turn input 412 that exceeds current through the tail input 414 when the signal is on the tail input 414.

While representative embodiments are described above, it is not intended that these embodiments describe all possible forms encompassed by the claims. The words used in the specification are words of description rather than limitation, and it is understood that various changes can be made without departing from the disclosure. As previously described, the features of various embodiments can be combined to form further embodiments of the claimed subject matter that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications or implementations.

What is claimed is:

1. A vehicle lamp comprising:
    a plurality of light emitting diodes configured to illuminate in response to receiving a signal on a turn input or on a tail input; and
    a switch configured to selectively block current flow from the tail input to the plurality of light emitting diodes in response to the signal on the turn input.

2. The vehicle lamp of claim 1 wherein the switch is further configured to allow current flow from the tail input to the plurality of light emitting diodes when no signal is applied to the turn input.

3. The vehicle lamp of claim 1 further comprising a stop input, wherein the plurality of light emitting diodes is further configured to illuminate in response to receiving the signal on the stop input.

4. The vehicle lamp of claim 3 wherein the switch is further configured to selectively block current flow from the stop input to the plurality of light emitting diodes in response to the signal on the turn input.

5. The vehicle lamp of claim 4 wherein the turn input and the stop input comprise a single combined input.

6. The vehicle lamp of claim 4 wherein the turn input is electrically connected to the stop input.

7. The vehicle lamp of claim 1 further comprising an electrical load selectively connected to the turn input to increase current flow through the turn input in response to the switch blocking current flow from the tail input.

8. The vehicle lamp of claim 1 wherein the switch comprises a plurality of transistors.

9. The vehicle lamp of claim 8 wherein the plurality of transistors comprises:
    a first transistor configured to turn on in response to the signal on the turn input; and
    a second transistor coupled to the first transistor and configured to turn off and block current flowing through the tail input in response to the first transistor turning on.

10. A vehicle lamp comprising:
    a plurality of light emitting diodes configured to illuminate in response to receiving a signal on a tail input or on a turn input; and
    a switching circuit connected to the tail input and the turn input and including a switch connected to the tail input and configured to open in response to the signal on the turn input to prevent current flowing through the tail input, and to close in response to no signal on the turn input to allow current to flow through the tail input.

11. The vehicle lamp of claim 10 further comprising an electric load activated in response to the switch being open and configured such that minimum current flow through the turn input when energized to illuminate the plurality of light emitting diodes exceeds minimum current flow through the tail input when energized to illuminate the plurality of light emitting diodes.

12. The vehicle lamp of claim 10 wherein the switching circuit comprises a first transistor connected to the turn input and configured to control the switch to open in response to the signal on the turn input.

13. The vehicle lamp of claim 12 wherein the switch comprises a second transistor.

14. The vehicle lamp of claim 10 further comprising a stop input connected to the switching circuit, wherein the switch is further configured to prevent current flowing through the stop input in response to the signal on the turn input.

15. The vehicle lamp of claim 10 further comprising a stop input connect to the switching circuit, wherein the switching circuit comprises a second switch configured to open in response to the signal on the turn input to prevent current flowing through the stop input.

16. The vehicle lamp of claim 10 wherein the turn input comprises a single combined turn/stop input.

17. A method for controlling a vehicle lamp having a plurality of light emitting diodes illuminated in response to a signal on a turn input or a tail input, comprising, by a controller or control circuitry:
   stopping current flow through the tail input to the plurality of light emitting diodes in response to the signal on the turn input;
   allowing current flow through the tail input to the plurality of light emitting diodes in response to no signal on the turn input.

18. The method of claim 17 wherein stopping current flow and allowing current flow comprise controlling a switch in response to the signal on the turn input.

19. The method of claim 17 wherein the lamp includes a stop input connected to the light emitting diodes, the method further comprising stopping current flow through the stop input to the plurality of light emitting diodes in response to the signal on the turn input.

20. The method of claim 17 further comprising connecting an electrical load to the turn input to provide a minimum current through the turn input when the signal is on the turn input that exceeds current through the tail input when the signal is on the tail input.

* * * * *